3,344,200
PROCESS FOR SELECTIVE PARTIAL HY-
DROGENATION OF POLYAROMATIC
COMPOUNDS
Milton M. Wald, Walnut Creek, and William E. Ross, El
Cerrito, Calif., assignors to Shell Oil Company, New
York, N.Y., a corporation of Delaware
No Drawing. Filed Nov. 30, 1964, Ser. No. 414,890
12 Claims. (Cl. 260—667)

This invention relates to hydrogenation of armoatics. In particular it relates to selective partial hydrogenation of aromatics with an aluminum halide-hydrogen iodide catalyst.

It has now been found that aromatic hydrocarbons having from 2 to 4 aromatic rings and 0 to 2 alkyl substituents can be selectively reduced to a compound having one aromatic ring with a catalyst comprising aluminum halide and HI. The reducing agent for the selective hydrogenation is HI, which is oxidized to elemental iodine. Iodine produced in the reaction can be reconverted to HI either externally or in situ; in a preferred aspect of the invention HI is regenerated in situ in the presence of hydrogen and a noble metal catalyst.

Aromatics suitable for selective partial reduction according to the invention are hydrocarbons having 2 to 4 aromatic nuclei and 0 to 2 alkyl substituents of 1 to 4 carbons. Examples of these compounds are naphthalene, anthracene, phenanthrene, naphthacene, chrysene, triphenylene, pyrene, fluorene, methylnaphthalene, gamma-ethylanthracene, etc. Unsubstituted aromatics are preferred starting materials. In general, these compounds are reduced by the process of the invention to a mononuclear aromatic compound; for instance, naphthalene is reduced to tetrahydronaphthalene. When the aromatic compound is substituted, hydrogenation occurs principally in the substituted ring; this is surprising since with conventional hydrogenation catalysts, hydrogenation proceeds more readily in the unsubstituted ring. This indicates that the mechanism of hydrogenation with catalysts of the invention is different from that associated with conventional catalysts. For convenience, the invention will be described in terms of naphthalene reduction.

Suitable temperatures for effecting the partial reduction process of the invention are 50° C. to 200° C., preferably 75° C. to 150° C. Autogenous pressure is satisfactory unless HI is regenerated in situ; in this case, hydrogen pressures of 100 to 3000 p.s.i., preferably 500 to 1500 p.s.i., are used. The reaction is carried out in the liquid phase, and may optionally be conducted in an inert solvent such as a saturated hydrocarbon or a halogenated aromatic (e.g. dichlorobenzene). Reaction times are not critical and usually range from 0.1 to 10 hours.

The reducing agent of the invention is a combination of aluminum halide and HI. Preferred aluminum halides are chloride, bromide, and iodide; aluminum chloride is preferred. The aluminum halide is used in an amount of from about 0.5% to about 20%, preferably 1-5% by weight of hydrocarbon processed. Hydrogen iodide is generally present in an amount of from 0.5 to 200%, preferably 5 to 100% by weight of the hydrocarbon to be reduced, subject to upper concentration limitations when a noble metal hydrogenation catalyst is also used, discussed below.

When naphthalene is reduced by HI, iodine is formed according to the following equation:

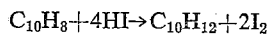

Since HI is consumed in the reaction, it is necessary to provide a method of regenerating the HI from $I_2$. This can be accomplished either by separation of the $I_2$ formed, e.g., by extraction, distillation, or crystallization, and subsequent external hydrogenation, or by in situ regeneration with a noble metal catalyst. The noble metal catalyst used to regenerate HI includes a catalytically effective amount of a noble or platinum group metal, preferably supported on an inert carrier such as alumina, magnesia, boria, silica, zirconia, titania, and the like. A preferred catalyst base is alumina, preferably activated alumina. The catalyst generally contains about 0.01 to 10%, preferably 0.1 to 8% by weight of one or more of the platinum metals of Group VIII, i.e., platinum, palladium, rhodium, ruthenium, osmium, or iridium. The preferred noble metal is platinum. The noble metal may be present in the metallic form or as a sulfide, oxide, or other combined form. If the noble metal is present in metallic form, it is preferably in very finely divided form, e.g., crystals of less than 100 angstrom units size.

The supported noble metal catalyst can be prepared by any well-known technique. The metal can be directly deposited on the support, or may be added to the base precursor, e.g., to the alumina hydrate which is subsequently calcined. The catalyst base precursor is preferably an amorphous hydrous alumina, alumina monohydrate, alumina trihydrate, or their mixtures. The hydrate containing the metal can be dried and calcined at a temperature of 750° F. to 1200° F. or more.

When the supported metal catalyst is employed to reconvert $I_2$ to HI, the concentration of HI maintained in the system is critical. It is surprising that even very small amounts of HI can be tolerated in the system, because HI is a known poison for noble metal catalyst. However, it has been found that as long as the concentration of HI is maintained below about 60 gms. HI/gm. noble metal, a satisfactory catalyst life is maintained. It is preferred to maintain a ratio of HI to noble metal between about 5 to about 50, preferably 10 to about 30, grams HI per gram of noble metal.

Several experiments were conducted to illustrate the selective reduction reaction of the invention. Naphthalene was chosen as the aromatic compound to be reduced. The general procedure used in each of the experiments was as follows: the solid and liquid components of the reaction mixture were loaded into a clean, oven-dried, 300 ml. stirred Hastelloy autoclave in a nitrogen-filled dry box. The reactor was sealed and attached to the autoclave assembly which comprised a pressure-gas manifold, autoclave stand, air-driven stirrer and pressure transducer. Gaseous components of the reaction mixture were pressured in from feed vessels mounted on a metrogram balance. The stirrer was activated to 900 r.p.m., and the autoclave was heated to the desired temperature. Reactor pressure was continuously recorded, via a pressure transducer, on a Brown recorder. After the heating period was complete, the reactor was cooled in an ice bath, and gaseous products were vented through a gas scrubber which contained a known amount of caustic. Amounts of iodine produced were measured by extracting the product with a known amount of aqueous stannous chloride solution. Organic products were analyzed by gas-liquid chromatography using a 25-foot silicon oil column.

Results of various experiments in which naphthalene was selectively hydrogenated to tetrahydronapthalene are shown in Table I below. Reaction conditions were 100° C. and 400–800 p.s.i.g. $H_2$; 50 ml of o-dichlorobenzene was used as solvent for each run.

Table 1.—Selective reduction of naphthalene

| Run No. | 1 | 2 | 3 | 4 | 5 | 6 | 7 |
|---|---|---|---|---|---|---|---|
| Time, hr | 2 | 2 | 2 | 10 | 2 | 2 | 2 |
| Feed, mmoles: | | | | | | | |
| Naphthalene | 40 | 40 | 100 | 100 | 100 | 100 | 100 |
| AlI$_3$ | 10 | | | | 10 | | |
| AlCl$_3$ | | | 10 | | | 10 | 10 |
| HI | 200 | 200 | 40 | 40 | 40 | 40 | a 40 |
| 5% Pt/Al$_2$O$_3$, grams | | | 5 | 5 | 5 | 5 | 5 |
| Rate of gas uptake, max., lb./hr | 51 | 120 | 88 | 120 | 160 | 355 | 1,670 |
| Total H$_2$ uptake, approx., mmoles | | | 122 | 198 | 183 | 200 | 129 |
| Products, relative yield: | | | | | | | |
| Decalins | 0 | Trace | 0.1 | 0.4 | 1.3 | 0.25 | 5 |
| Tetralin | 90 | 100 | 61.5 | 83.4 | 89 | 99.5 | 63 |
| Naphthalene | 10 | 0 | 38 | 16.3 | 10 | 0.25 | 32 |
| Iodine found, meq | 137 | 134 | 0.5 | 4.7 | 0.5 | 6.2 | |
| Selectivity to tetrahydronaphthalene, percent | 100 | ~100 | 99.8 | 99.6 | 98.6 | 99.7 | 92.8 |
| Conversion, percent | 90 | 100 | 62 | 84 | 90 | 99.7 | 68 | a HCl.

Several important conclusions are apparent from the results shown in the table. The first two experiments illustrate the reduction reaction, and show that HI is indeed the reducing agent. In each case the remarkable selectivity of the reduction is apparent; essentially no completely saturated product was formed and the product consisted entirely of tetrahydronaphthalene, even though an excess of HI was used and the reaction time was considerably in excess of that required. This high selectivity persists even at 100% naphthalene conversion.

The process of runs 1 and 2 has the disadvantage of forming large amounts of iodine (two moles for each mole of naphthalene reduced) in the product, requiring separation from the product and subsequent reduction of the iodine to HI. This problem is overcome in experiments 3-7, which illustrate that the iodine produced in the aromatics reduction can be reconverted to HI in the presence of hydrogen and a supported noble metal catalyst (5% wt. Pt on activated alumina). Conversion and selectivity are maintained at high levels, and, at optimum conditions (Run 6), a tetrahydronaphthalene selectivity of 99.7% was obtained at naphthalene conversion of 99.7% with only a slight amount of I$_2$ formed. Experiment 7 shows that when another hydrogen halide (HCl) is substituted for HI as reducing agent, both conversion and selectivity are materially adversely affected. A comparison of Runs 3 and 4 with Runs 5 and 6 shows the large increase in rate attributable to the presence of aluminum halide; complete conversion could not be achieved even in ten hours (Run 4), apparently because of a catalyst poison which is evidently produced when HCl is substituted for HI, since although the initial rate of hydrogenation is very high when HCl is present, ultimate conversions are low (Run 7).

To illustrate the effect of an alkyl group attached to an aromatic ring on the hydrogenation reaction of the invention, 2-methylnaphthalene was hydrogenated by the method described above. The reaction was conducted at 100° C. and 700 p.s.i.g. for two hours in 50 ml. of o-dichlorobenzene. Results of the experiment are tabulated below.

Table II.—Reduction of 2-methylnaphthalene

Feed, mmoles:
| | |
|---|---|
| AlCl$_3$ | 10 |
| HI | 200 |
| C$_{10}$H$_7$CH$_3$ | 40 |

Products, relative amounts of C$_{10}$–C$_{12}$ hydrocarbons,a percent:
| | |
|---|---|
| Tetralin | 20.8 |
| Naphthalene | 2.1 |
| 2-Methyltetrahydronaphthalene | 46.6 |
| 5- and 6-methyltetrahydronaphthalene | 18.1 |
| A C$_{11}$ tetrahydronaphthalene | 5.3 |
| A C$_{12}$ tetrahydronaphthalene | 5.3 |
| C$_{10}$H$_7$CH$_3$ | 1.8 |

Table II.—Continued

| | |
|---|---|
| Selectivity to tetrahydronaphthalene, percent | 97.9 |
| Conversion, percent | 98.2 | a Product separated by GLC and the tetrahydronaphthalene identified by mass spectrometry.

From this table it is apparent that even at very high conversions of methylnaphthalene, high selectivity to tetrahydronaphthalene is maintained. About two-thirds of the methyltetrahydronaphthalene formed were 2-methyltetrahydronaphthalene, indicating that hydrogenation occurs mainly in the substituted ring. This is in contrast to results obtained with other known hydrogenation catalysts; for example, Fieser and Jones, J. Am. Chem. Soc., 60, 1940 (1938) found that hydrogenation with Raney nickel gave chiefly 6-methyltetrahydronaphthalene.

We claim as our invention:

1. A process for selectively reducing an aromatic compound having from 2 to 4 nuclei and 0 to 2 alkyl substituents of 1 to 4 carbon atoms and mixtures thereof which comprises contacting the aromatic compound with a catalytically effective amount of aluminum halide and HI under hydrogenation conditions and recovering a partially hydrogenated product having one aromatic ring per molecule.

2. A process for selectively reducing an aromatic compound having from 2 to 4 aromatic nuclei and 0 to 2 alkyl substituents of from 1 to 4 carbon atoms and mixtures thereof which comprises contacting the aromatic compound with catalytically effective amounts of aluminum halide and HI in the liquid phase at a temperature of 50° C. to 200° C. and recovering partially hydrogenated products having one aromatic ring per molecule.

3. A process for selectively reducing an aromatic compound having from 2 to 4 nuclei and 0 to 2 alkyl substituents of 1 to 4 carbon atoms and mixtures thereof which comprises contacting the aromatic compound with from about 0.5% to about 20% by weight of aluminum halide and a catalytically effective amount of HI in the liquid phase at 50°–200° C. and at a hydrogen pressure of from about 100 to about 3000 p.s.i., and recovering partially hydrogenated products having one aromatic ring per molecule.

4. The process of claim 3 wherein the aromatic compound to be hydrogenated is naphthalene and the hydrogenated product is tetrahydronaphthalene.

5. The process of claim 4 wherein the aluminum halide is aluminum chloride.

6. A process for selectively reducing an aromatic compound having from 2 to 4 nuclei and 0 to 2 alkyl substituents of 1 to 4 carbon atoms and mixtures thereof which comprises contacting the aromatic compound with from 0.5% to about 20% by weight of aluminum halide and about 5% to about 200% by weight of HI in the liquid phase at a temperature of from about 50° C. to 200° C. for from about 0.1 to 10 hours at a hydrogen pressure of from about 100–3000 p.s.i., and recovering partially hydrogenated products having one aromatic ring per molecule.

7. A process for selectively reducing an aromatic compound having from 2 to 4 nuclei and 0 to 2 alkyl substituents of 1 to 4 carbon atoms and mixtures thereof which comprises contacting the aromatic compound with catalytically effective amounts of aluminum halide and HI under hydrogenation conditions in the presence of a noble metal hydrogenation catalyst in an amount such that concentration of HI does not exceed 60 grams HI per gram noble metal, and recovering partially hydrogenated products having one aromatic ring per molecule.

8. The process of claim 7 wherein the aromatic compound is naphthalene and the hydrogenated product is tetrahydronaphthalene.

9. A process for selectively reducing an aromatic compound having from 2 to 4 nuclei and 0 to 2 alkyl substituents of 1 to 4 carbon atoms and mixtures thereof which comprises contacting the aromatic compound with 0.5 to about 20% by weight of aluminum halide and from about 0.5–200% by weight of hydrogen iodide in the liquid phase at a temperature of from about 75° C.–150° C. at a hydrogen pressure of about 100–3000 p.s.i. in the presence of a supported noble metal hydrogenation catalyst having from about .01–10% by weight of noble metal on an inert support, said noble metal hydrogenation catalyst being present in an amount such that the weight ratio of HI to noble metal does not exceed 60, and recovering a partially hydrogenated product having one aromatic ring per molecule.

10. The process of claim 9 wherein the aromatic compound is naphthalene and the hydrogenated product is tetrahydronaphthalene.

11. The process of claim 9 wherein the supported metal hydrogenation catalyst is platinum supported on activated aluminum.

12. The process of claim 11 wherein the aromatic compound is naphthalene and the hydrogenated product is tetrahydronaphthalene.

References Cited
UNITED STATES PATENTS

| | | | |
|---|---|---|---|
| 2,739,993 | 3/1956 | Schneider et al. | 260—667 |
| 3,091,649 | 5/1963 | Schneider | 260—667 |
| 3,128,316 | 4/1964 | Schneider | 260—667 |

DELBERT E. GANTZ, *Primary Examiner.*

SAMUEL P. JONES, *Examiner.*